(12) United States Patent
Kaushik

(10) Patent No.: US 8,990,394 B2
(45) Date of Patent: Mar. 24, 2015

(54) SYSTEM AND METHOD FOR PROVIDING SESSION-LEVEL ACCESS MANAGEMENT OF ACCESS REQUESTS TO A REDIRECTED DEVICE FROM A PREDETERMINED SESSION

(71) Applicant: Wyse Technology Inc., San Jose, CA (US)

(72) Inventor: Puneet Kaushik, Ghaziabad (IN)

(73) Assignee: Wyse Technology L.L.C., San Jose, CA (US)

( * ) Notice: Subject to any disclaimer, the term of this patent is extended or adjusted under 35 U.S.C. 154(b) by 78 days.

(21) Appl. No.: 13/651,321

(22) Filed: Oct. 12, 2012

(65) Prior Publication Data

US 2013/0297792 A1    Nov. 7, 2013

Related U.S. Application Data

(60) Provisional application No. 61/643,807, filed on May 7, 2012.

(51) Int. Cl.
*G06F 15/16* (2006.01)
*H04L 29/06* (2006.01)
*H04L 29/08* (2006.01)

(52) U.S. Cl.
CPC .............. *H04L 67/146* (2013.01); *H04L 63/10* (2013.01); *H04L 67/42* (2013.01)
USPC ............ 709/225; 709/203; 709/206; 711/163

(58) Field of Classification Search
CPC .................. H04N 2201/0094; H04N 1/32561; H04N 1/0035; H04L 63/10; H04L 63/00; H04L 63/20
USPC .............. 709/203, 206, 225; 711/163; 340/10
See application file for complete search history.

(56) References Cited

U.S. PATENT DOCUMENTS

| | | | |
|---|---|---|---|
| 6,421,055 B1 * | 7/2002 | Jones et al. | 345/471 |
| 7,577,838 B1 * | 8/2009 | Rossmann | 713/165 |
| 7,783,788 B1 * | 8/2010 | Quinn et al. | 710/8 |
| 2002/0002616 A1 * | 1/2002 | Lim | 709/227 |
| 2002/0133487 A1 * | 9/2002 | Oshins et al. | 707/5 |
| 2003/0046366 A1 * | 3/2003 | Pardikar et al. | 709/219 |
| 2004/0039969 A1 * | 2/2004 | Pratt et al. | 714/42 |
| 2005/0172094 A1 * | 8/2005 | Goodwin | 711/163 |
| 2007/0047524 A1 * | 3/2007 | Moriya | 370/352 |
| 2010/0198924 A1 * | 8/2010 | Collet et al. | 709/206 |
| 2011/0004753 A1 * | 1/2011 | Gomi et al. | 713/156 |
| 2011/0167242 A1 * | 7/2011 | de Jong et al. | 712/205 |
| 2012/0081213 A1 * | 4/2012 | Rosenblatt | 340/10.34 |
| 2012/0084184 A1 * | 4/2012 | Raleigh et al. | 705/30 |
| 2012/0317237 A1 * | 12/2012 | Kazan et al. | 709/219 |

* cited by examiner

*Primary Examiner* — Tesfay Yohannes
(74) *Attorney, Agent, or Firm* — Baker Botts L.L.P.

(57) ABSTRACT

Managing access requests to a device is provided. The operations may include determining that a device stack corresponds to the device that is remote to the server and is connected locally to a client that is remote to the server, the device stack comprising one or more device objects; attaching a device access restriction object on top of the device stack; facilitating restriction of access to the one or more device objects from sessions different from a session associated with the device; receiving, at the device access restriction object, an access request to the device; and determining, at the device access restriction object, whether the access request is allowed access to the device. The access request may be allowed if a session from which the access request is received is a predetermined session.

28 Claims, 14 Drawing Sheets

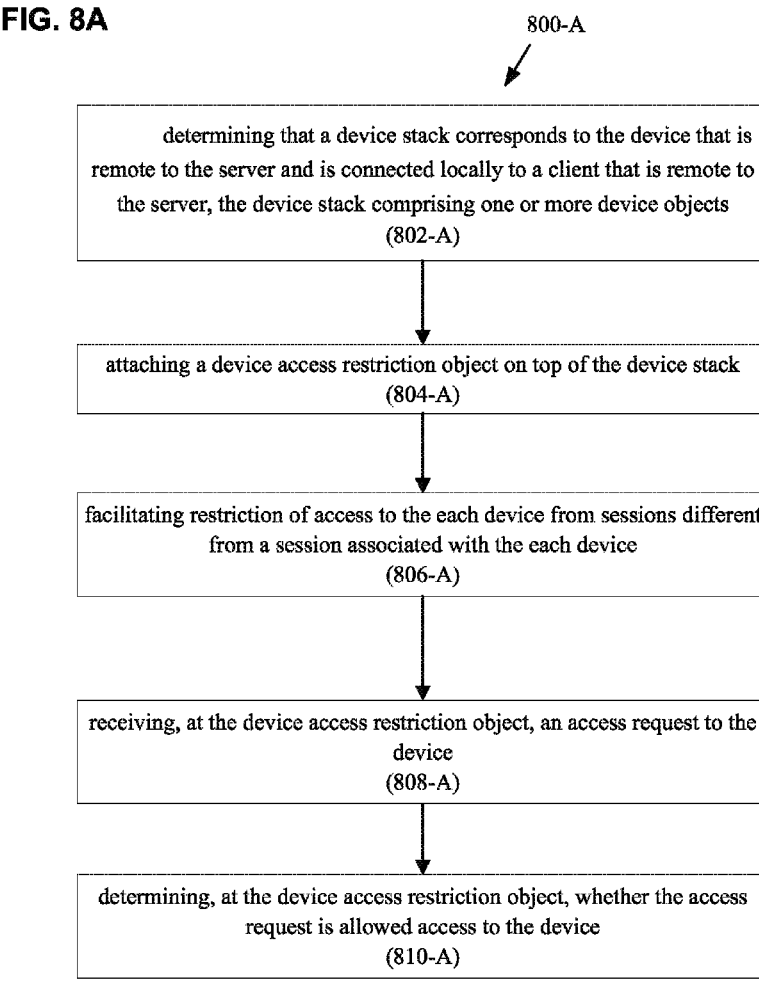

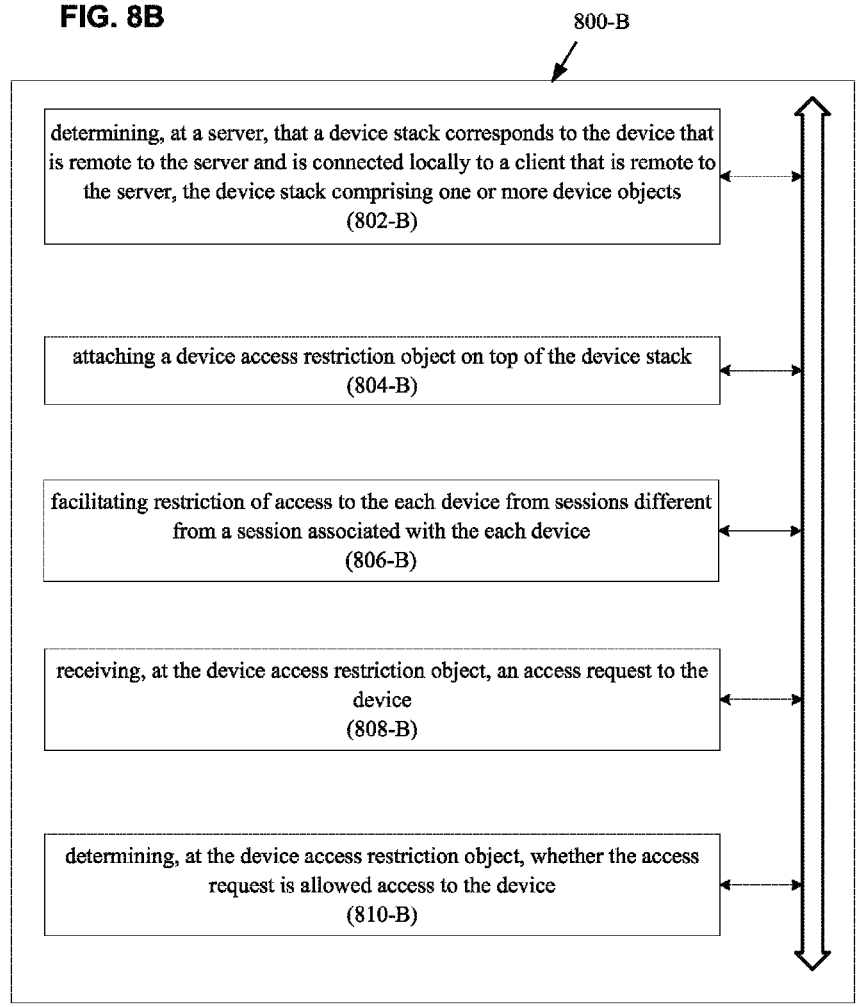

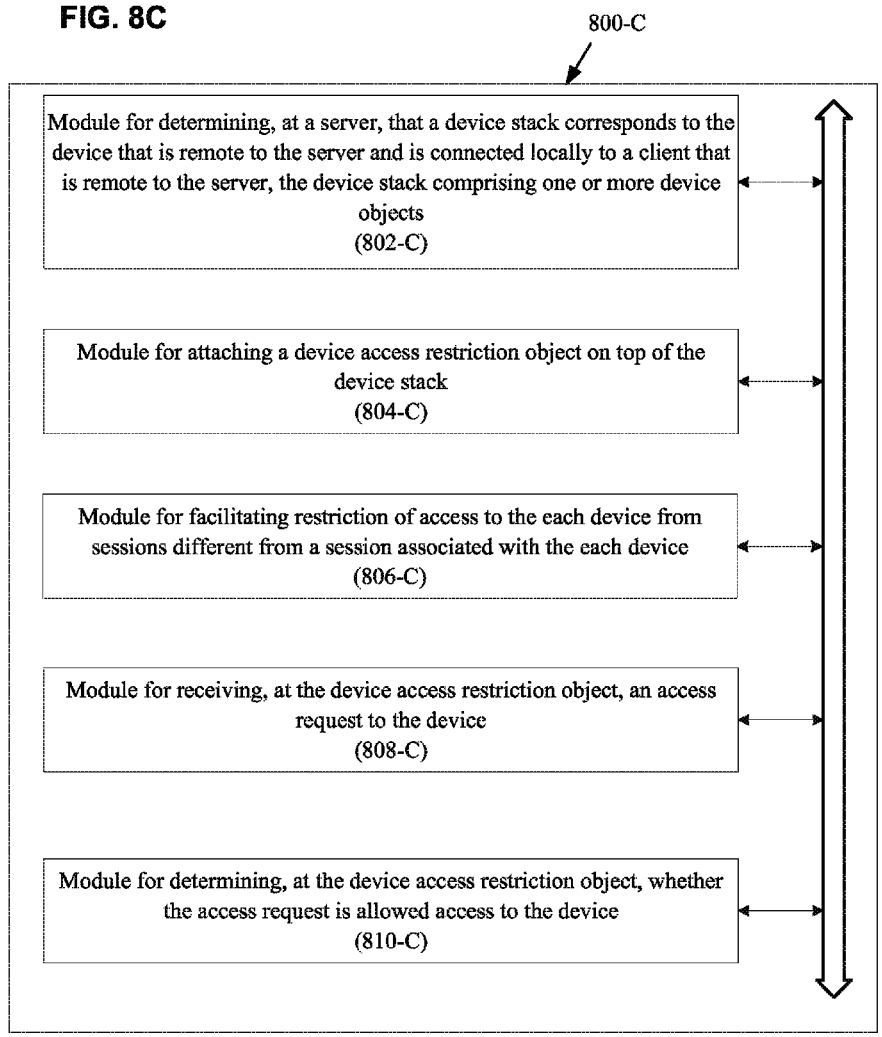

SYSTEM AND METHOD FOR PROVIDING SESSION-LEVEL ACCESS MANAGEMENT OF ACCESS REQUESTS TO A REDIRECTED DEVICE FROM A PREDETERMINED SESSION

CROSS-REFERENCES TO RELATED APPLICATIONS

The present application claims the benefit of priority from U.S. Provisional Patent Application Ser. No. 61/643,807, entitled "SYSTEM AND METHOD FOR PROVIDING SESSION-LEVEL ACCESS MANAGEMENT OF A REDIRECTED DEVICE," filed on May 7, 2012, which is hereby incorporated by reference in its entirety for all purposes.

FIELD

The disclosure relates in general to remote computing, and more particularly to managing access to a redirected device, and more particularly to providing management of access requests to a redirected device from a predetermined session.

BACKGROUND

One approach to the design and implementation of computer networks, particularly with regard to the development of client/server applications, includes designing client applications and client terminals so that the majority of the heavily used resources are at a remote computing machine, such as a centralized server, connected via a network. The client terminals generally have minimal memory, disk storage, and processor power, but are designed under the premise that most users connected to a powerful server do not need the additional processing power. With these client terminals, the total cost of ownership is minimized, because of the reduced resources and because the clients can be centrally administered and updated from the server. As such, these client terminals are suited for a network which can handle a significant number of terminals. If the client terminals have devices attached to them, then when the client terminals are connected to the server, not only the client terminals but also the client terminals' devices can become available to the server.

SUMMARY

In one aspect, a method for access requests to a redirected device from a predetermined session may comprise determining that a device stack corresponds to the device that is remote to the server and is connected locally to a client that is remote to the server, the device stack comprising one or more device objects; attaching a device access restriction object on top of the device stack; facilitating restriction of access to the one or more device objects from sessions different from a session associated with the device; receiving, at the device access restriction object, an access request to the device; and determining, at the device access restriction object, whether the access request is allowed access to the device.

In one aspect, a machine-readable storage medium encoded with instructions executable by one or more processors to perform one or more operations is provided. The one or more operations may comprise determining, at a server, that a device stack corresponds to the device that is remote to the server and is connected locally to a client that is remote to the server, the device stack comprising one or more device objects; attaching a device access restriction object on top of the device stack; facilitating restriction of access to the one or more device objects from sessions different from a session associated with the device; receiving, at the device access restriction object, an access request to the device; and determining, at the device access restriction object, whether the access request is allowed access to the device.

In one aspect, an apparatus may comprise one or more modules configured to perform one or more operations comprising: determining, at a server, that a device stack corresponds to the device that is remote to the server and is connected locally to a client that is remote to the server, the device stack comprising one or more device objects; attaching a device access restriction object on top of the device stack; facilitating restriction of access to the one or more device objects from sessions different from a session associated with the device; receiving, at the device access restriction object, an access request to the device; and determining, at the device access restriction object, whether the access request is allowed access to the device.

In one aspect, an apparatus may comprise: means for determining, at a server, that a device stack corresponds to the device that is remote to the server and is connected locally to a client that is remote to the server, the device stack comprising one or more device objects; means for attaching a device access restriction object on top of the device stack; means for facilitating restriction of access to the one or more device objects from sessions different from a session associated with the device; receiving, at the device access restriction object, an access request to the device; and means for determining, at the device access restriction object, whether the access request is allowed access to the device.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

FIG. 8A is a block diagram representing an example of a method for providing management of access requests to a redirected device from a predetermined session, in accordance with one aspect of the disclosure.

FIG. 8B is a block diagram representing an example of a machine-readable storage medium encoded with instructions executable by a processor to perform a method for providing management of access requests to a redirected device from a predetermined session, in accordance with one aspect of the disclosure.

FIG. 8C is a block diagram representing an example of an apparatus for providing management of access requests to a redirected device from a predetermined session, in accordance with one aspect of the disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Frequently, devices connected to client terminals (also referred to as "clients" or "client-side devices") are virtualized on a server to provide access to the devices from user sessions on the server. The virtualized devices (or redirected devices), however, are accessible from a large number of user sessions and/or client terminals. For example, in an office environment, multiple user sessions and/or clients may be connected to a server on which the device is virtualized (or redirected), and all of the multiple user sessions and/or clients connected to the server may have access to the device. A user's virtualized device connected to the user's client terminal may thus be subject to unwanted or unauthorized access or use by other users' sessions, and/or from other users' clients.

A module may be provided which may hook into the kernel of the server's operating system to block any unwanted or unauthorized accesses. However, in certain operating systems, such hooks are difficult to make. For example, 64-bit versions of the Windows operating system implement Kernel Patch Protection (KPP), which protects the Windows Kernel from hooks and patches.

A need therefore exists for systems and methods that allow access to virtualized devices to be restricted, such that secure and private access to such devices can be provided from selected user sessions while access from other user sessions can be blocked.

Figure 1:
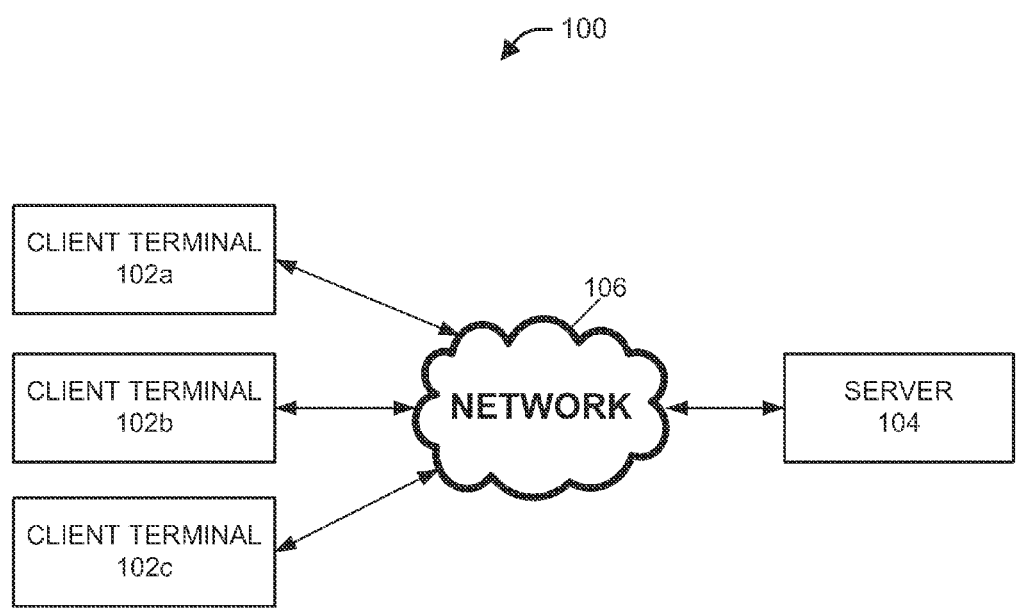
FIG. 1 is a conceptual block diagram of an example of a computer network.

FIG. 1 illustrates a simplified diagram of a system 100 in accordance with an aspect of the present disclosure. The system 100 may include one or more client terminals 102a, 102b, 102c (referenced generally herein as client(s) 102) in communication with a server 104 via a network 106. In one aspect, the server 104 is configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

In one aspect, the client terminal 102 may represent a computer, a mobile phone (e.g., smart phone), a laptop computer, a thin client terminal, a personal digital assistant (PDA), a portable computing terminal, or a suitable terminal or device with a processor. In one aspect, a server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

In one aspect, the client 102 may initiate a remote session with the server 104 by sending a request for remote access and credentials (e.g., login name and password) to the server 104. If the server 104 accepts the credentials from the client 102, then the server 104 may establish a remote session, which allows a user at the client 102 to access applications and data at the server 104. During the remote session, the server 104 sends display data to the client 102 over the network 106, which may include display data of a desktop and/or one or more applications running on the server 104. The desktop may include, for example, icons corresponding to different applications that can be launched on the server 104. The display data allows the client 102 to locally display the desktop and/or applications running on the server 104.

During the remote session, the client 102 may send user commands (e.g., inputted via a mouse or keyboard at the client 102) to the server 104 over the network 106. The server 104 may process the user commands from the client 102 similar to user commands received from an input device that is local to the server 104. For example, if the user commands include mouse movements, then the server 104 may move a pointer on the desktop running on the server 104 accordingly. When the display data of the desktop and/or application changes in response to the user commands, the server 104 sends the updated display data to the client 102. The client 102 locally displays the updated display data so that the user at the client 102 can view changes at the server 104 in response to the user commands. Together, these aspects allow the user at the client 102 to locally view and input commands to the desktop and/or application that is running remotely on the server 104. From the perspective of the client side, the desktop running on the server 104 may represent a virtual desktop environment.

Figure 2A:
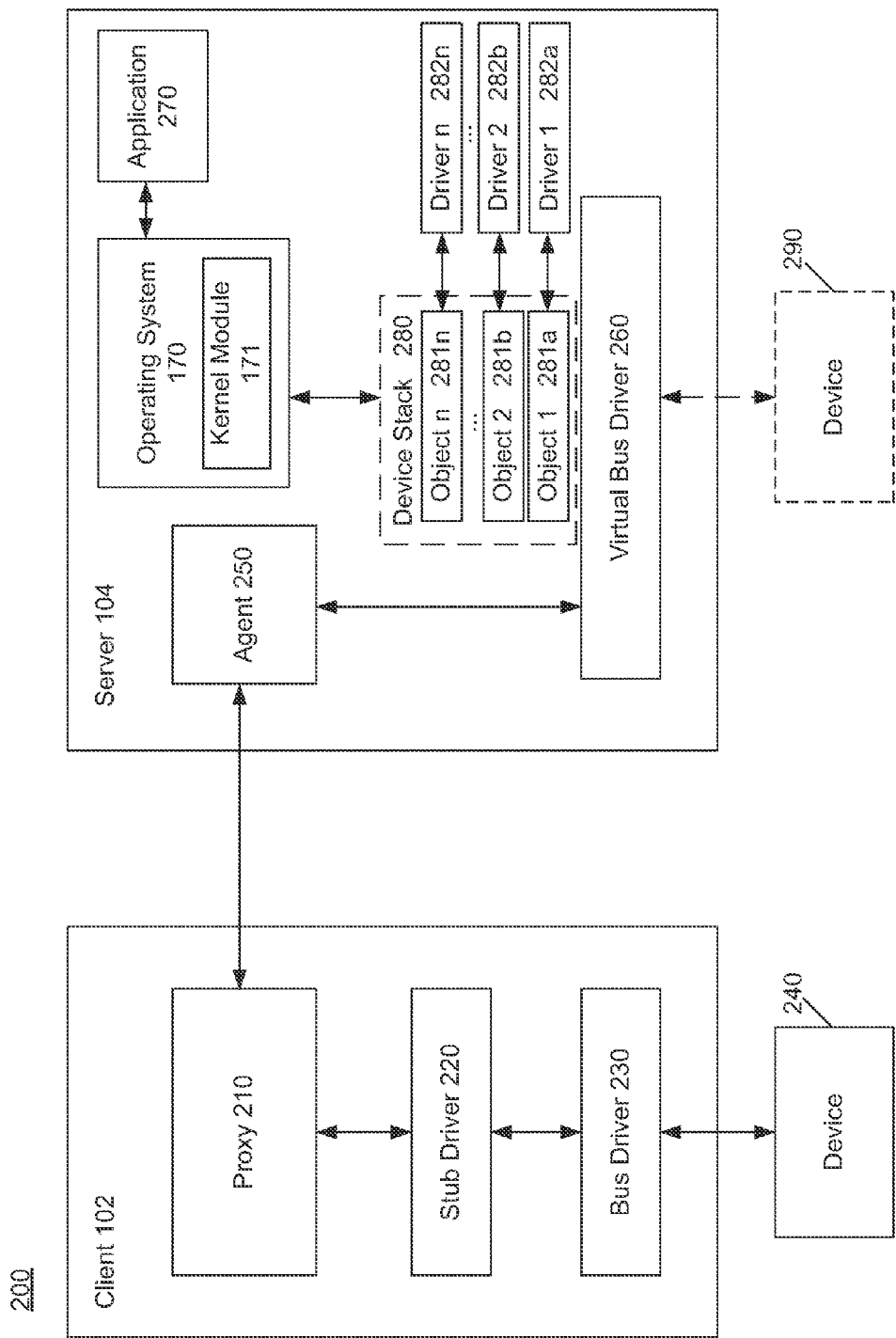
FIG. 2A is a conceptual block diagram illustrating an example of a local device virtualization system.

FIG. 2A is a block diagram of a local device virtualization system 200 according to an aspect of the disclosure. The system 200 may include the client 102 in communication with the server 104 over the network 106 (illustrated in FIG. 1). The client 102 may include a proxy 210, a stub driver 220, and a bus driver 230. The client 102 can be connected to a device 240, as shown in FIG. 2A. The server 104 may include an agent 250, and a virtual bus driver 260.

According to the illustrated configuration, while the device 240 is not locally or physically connected to the server 104 and is remote to the server 104, the device 240 appears to the server 104 as if it is locally connected to the server 104, as discussed further below. Thus, the device 240 appears to the server 104 as a virtual device 290.

By way of illustration and not limitation, the device 240 may be a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to the client 102. The device 240 may be an external device (i.e., external to the client 102) or an internal device (i.e., internal to the client 102).

In one aspect of the disclosure, the device 240 is a Universal Serial Bus (USB) device that can be locally connected to the client 102 using a wired USB or wireless USB connection and communicates with the client 102 according to a USB communications protocol. In another aspect, the device 240 may be a device other than a USB device.

As used herein, a "local" device of a system, or a device "locally" connected to a system, may be a device directly connected to the system using one or more wires or connectors (e.g., physically connected to the system), or a device directly connected to the system using a wireless link (e.g., Bluetooth). For example, device 240 is a local device of client 102. Furthermore, in one aspect of the disclosure, a local device of a system or a device locally connected to a system may include a device within the system (e.g., an internal device of client 102).

A "remote" device, or a device "remote" to a system, may be a device that is not directly connected to the system. For example, the server 104 is remote to both client 102 and device 240 because server 104 is not directly connected to client 102 or device 240 but connected indirectly through network 106 (illustrated in FIG. 1), which can include, for example, another server, or the Internet.

The bus driver 230 can be configured to allow the operating system and programs of the client 102 to interact with the device 240. In one aspect, when the device 240 is connected to the client 102 (e.g., plugged into a port of the client 102), the bus driver 230 may detect the presence of the device 240 and read information regarding the device 240 ("device information") from the device 240. The device information may include features, characteristics and other information specific to the device 240. For an example of a USB device, the device information may comprise a device descriptor (e.g., product ID, vendor ID and/or other information), a configuration descriptor, an interface descriptor, an endpoint descriptor and/or a string descriptor. The bus driver 230 may communicate with the device 240 through a computer bus or other wired or wireless communications interface.

In one aspect, a program (e.g., application) running locally on the client 102 may access the device 240. For example, the device 240 may be accessed locally when the client 102 is not connected to the server 104. In this aspect, the operating system (e.g., Microsoft Windows®) of the client 102 may use the device information to find and load an appropriate device driver (not shown) for the device 240. The device driver may provide the program with a high-level interface to the device 240.

In one aspect, the device 240 may be accessed from the server 104 as if the device were connected locally to the server 240. The device 240 may be accessed from the server 104 when the client 102 is connected to the server 104 through a user session running on the server 104. For example, the device 240 may be accessible from the desktop running on the server 104 (i.e., virtual desktop environment). In this aspect, the bus driver 230 may be configured to load the stub driver 220 as the default driver for the device 240. The stub driver 220 may be configured to report the presence of the device 240 to the proxy 210 and to provide the device information (e.g., device descriptor) to the proxy 210.

The proxy 210 may be configured to report the presence of the device 240, along with the device information, to the agent 250 of the server 104 over the network 106 (illustrated in FIG. 1). Thus, the stub driver 220 redirects the device 240 to the server 104 via the proxy 210.

The agent 250 may be configured to receive the report from the proxy 210 that the device 240 is connected to the client 102 and the device information. The agent 250 may further be configured to associate with the report from the proxy 210 one or more identifiers for the client 102 and/or for a user session through which the client 102 is connected to the server 104, such as a session number or a session locally unique identifier (LUID). The agent 250 can provide notification of the device 240, along with the device information, to the virtual bus driver 260. The virtual bus driver 260 (which may be a TCX USB bus driver, or any other bus driver) may be configured to create and store in memory a record corresponding to the device 240, the record including at least part of the device information and session identifiers received from agent 250. The virtual bus driver 260 may be configured to report to the operating system 170 of the server 104 that the device 240 is connected and to provide the device information to the operating system. This allows the operating system of the server 104 to recognize the presence of the device 240 even though the device 240 is connected to the client 102.

In one aspect, a kernel module (or a kernel) 171 may be a component of the operating system 170, and the virtual bus driver 260 may be configured to report to the kernel module of the operating system. A kernel module may be a bridge between software applications and data processing performed at hardware devices (e.g., a processor, memory or other physical devices). In one example, a kernel module manages a computer's resources (such as the communication between hardware and software components).

The operating system of the server 104 may use the device information to find and load one or more appropriate device drivers for the device 240 at the server 104. Each driver may have an associated device object (object(s) 281*a*, 281*b*, . . . , 281*n*, referred to generally as device object(s) 281), as illustratively shown in FIG. 2A. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . , 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for the device 240. For example, for a USB device, a USB bus driver will create a device object 281*a* stating that a new device has been plugged in. Next, a plug-and-play (PNP) component of the operating system kernel (e.g., Windows kernel) will search for and load the best driver for the device 240, which will create another device object 281*b* that is layered over the previous device object 281*a*. The layering of device objects 281 will create the device stack 280.

The device objects 281 may be stored in a memory of the server 104 associated with the virtual bus driver 260. In particular, the device objects 281 and resulting device stack 280 may be stored in random-access memory of the server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by the operating system 170 of the server 104, each device object 281 can create a symbolic link (also referred to as a "device interface") to the device object 281 and associated device driver 282. The symbolic link is used by applications running on the server 104 to access the device object 281 and the device 240/290. The symbolic link can be created by a call to a function such as IOCreateSymbolicLink( ) including such arguments as a name for the symbolic link, and a name of the device object 281 or associated device 240. In one example, for example, a symbolic link to a USB flash drive device 240 is created by a call from a device object 281 for the device 240 to the function IOCreateSymbolicLink( ) including arguments "\\GLOBAL??\C:" (i.e., the name for the symbolic link) and "\Device\HarddiskVolume1" (i.e., a name of the device object).

A device interface is similar to a symbolic link, and the terms are used interchangeably herein. In Windows-based operating systems, a device interface may be a symbolic link for which the name is chosen by Windows based on device type.

The creation of a symbolic link results in an entry being created in an object manager namespace (OMN) (described in more detail in relation to FIG. 4A below) of the operating system 170. The OMN stores information on symbolic links created for and used by the operating system 170, including symbolic links for devices 240, virtualized devices 290, and applications 270 running on the server 104.

As a result of the symbolic link creation process, a symbolic link to the device 240 is enumerated in the OMN of the server 104. Once the presence of the device 240 is reported to the operating system 170 of the server 104, the device 240 may be accessible from a user session (and associated desktop) running on the server 104 (i.e., virtual desktop environment). For example, the device 240 may appear as an icon on the virtual desktop environment and/or may be accessed by applications running on the server 104.

In one aspect, an application 270 running on the server 104 may access the device 240 by sending a transaction request including the symbolic link for the device 240 to the operating system 170. The operating system 170 may consult the Object Manager Namespace to retrieve an address or other identifier for the device itself 240 or for a device object 281 associated with the device 240. Using the retrieved address or identifier, the operating system 170 forwards the transaction request for the device 240 either directly, through a device object 281 of the device stack 280, and/or through the virtual bus driver 260. The virtual bus driver 260 may direct the transaction request to the agent 250, which sends the transaction request to the proxy 210 over the network 106. The proxy 210 receives the transaction request from the agent 250, and directs the received transaction request to the stub driver 220.

The stub driver 220 then directs the transaction request to the device 240 through the bus driver 230.

The bus driver 230 receives the result of the transaction request from the device 240 and sends the result of the transaction request to the stub driver 220. The stub driver 220 directs the result of the transaction request to the proxy 210, which sends the result of the transaction request to the agent 250 over the network 106. The agent 250 directs the result of the transaction request to the virtual bus driver 260. The virtual bus driver 260 then directs the result of the transaction request to the application 270 either directly or through a device object 281 of the device stack 280.

Thus, the virtual bus driver 260 may receive transaction requests for the device 240 from the application 270 and send results of the transaction requests back to the application 270 (either directly or through a device object 281 of the device stack 280). As such, the application 270 may interact with the virtual bus driver 260 in the same way as with a bus driver for a device that is connected locally to the server 104. The virtual bus driver 260 may hide the fact that it sends transaction requests to the agent 250 and receives the results of the transaction requests from the agent 250 instead of a device that is connected locally to the server 104. As a result, the device 240 connected to the client 102 may appear to the application 270 as if the physical device 240 is connected locally to the server 104.

The Object Manager Namespace (OMN) stores information on symbolic links created for use by the operating system 170, including symbolic links for devices and for applications running on the server 104. The Object Manager Namespace generally includes several different namespaces for storing symbolic link information for applications and devices. For example, the Object Manager Namespace can include namespaces such as: a "Global" namespace used to store symbolic link information for devices and applications that are shared by all user sessions running on the server 104; various "Local" namespaces, each associated with a user session running on the server 104, used to store information for applications used by (and restricted to) the associated user session; and a "Device" namespace used to store device object names of devices and virtual devices accessible by the server 104. A "Global" namespace may be referred to as a global namespace. A "Local" namespace may be referred to as a local namespace. A "Device" namespace may be referred to as a device namespace.

As described herein, symbolic links can be stored in a global namespace or a local namespace. Symbolic links stored in a global namespace may be available to the entire system (i.e., to all user sessions running on server 104), while symbolic links stored in a local namespace may only be seen and accessed by the session for which they are created. For example, "\\GLOBAL??\c:" may be a symbolic link stored in a global namespace. "\Device\HarddiskVolume1" may be a device object name stored in a device namespace. A symbolic link "\\GLOBAL??\c:" may be pointing to a device object having a device object name of "\Device\HarddiskVolume1". Because "c:" is a symbolic link in the global namespace directory, such a symbolic link may be accessed by the entire system, including all the users logged in through their respective user sessions. A user application can open "\\GLOBAL??\c:" or just "c:" to access the actual device.

In certain operating systems, such as the Windows operating system, the creation of the symbolic link for a device 240 results in an entry being created in a Global namespace of the Object Manager Namespace. Because the symbolic link is created in the Global namespace, the symbolic link can be accessed from any user session running on server 104. As a result, the device 240 associated with the symbolic link can be accessed from any user session on the server 104, and/or from any client terminal having an active user session on server 104.

Figure 2B:
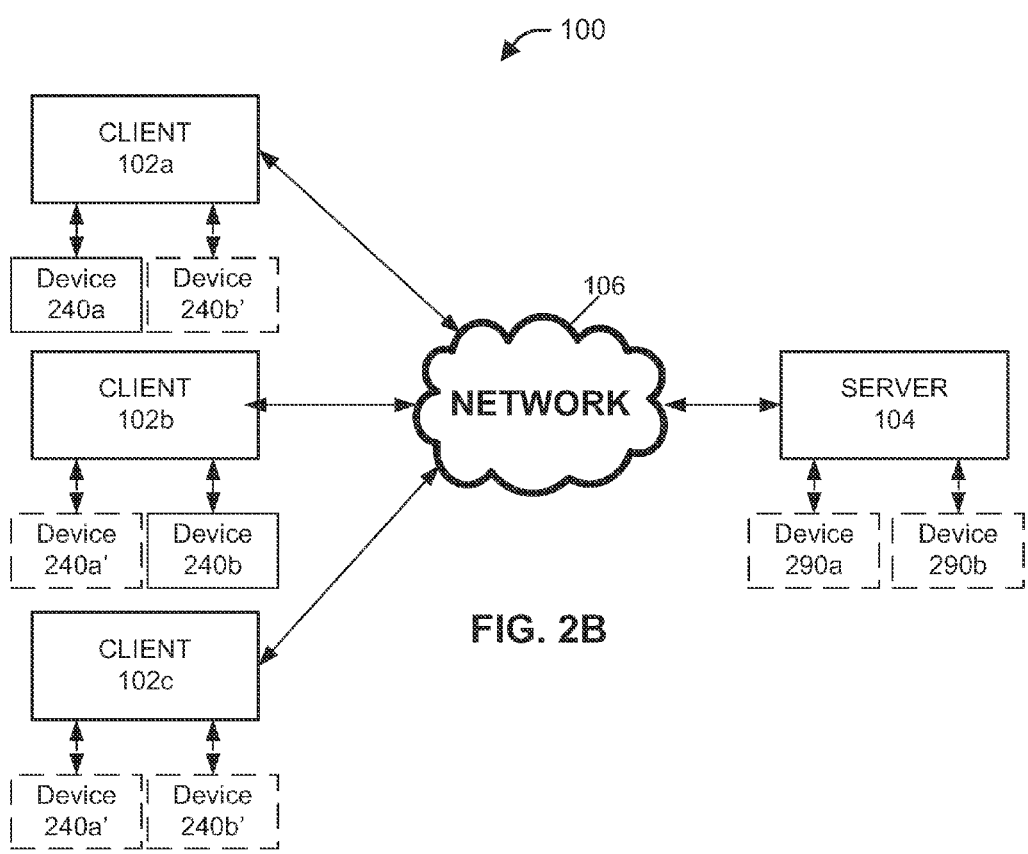
FIG. 2B is a conceptual block diagram of an example of a computer network providing local device virtualization.

FIG. 2B illustratively shows a block diagram of a computer network 100 providing local device virtualization. As previously described in relation to FIG. 1, network 100 includes client terminals 102a, 102b, and 102c, communicating through network 106 with server 104. Each client terminal can have one or more connected devices, such as device 240a connected to client terminal 102a, and device 240b connected to client terminal 102b.

As described in relation to FIG. 2A above, each device 240a, 240b can be virtualized on the server 104 to provide access to the device from a user session on the server 104 through a corresponding virtual device 290a, 290b. For example, when device 240a is connected to client terminal 102a, drivers for device 240a may be loaded in operating system 170 of server 104, the device 240a may be virtualized on server 104 as virtual device 290a, and a symbolic link to the device 240a may be created in the Object Manager Namespace of operating system 170. Once the symbolic link is created, a user of client terminal 102a may be able to access device 240a through a user session on server 104. Similarly, when device 240b is connected to client terminal 102b, a symbolic link to the device 240b may be created in the Object Manager Namespace of operating system 170 of server 104. Once the symbolic link is created, a user of client terminal 102b may be able to access device 240b through a user session on server 104.

The symbolic links to the devices 240a, 240b are created in a Global namespace of the Object Manager Namespace of operating system 170. As a result, the symbolic links and associated devices can be accessed from and used by any user session running on server 104. For example, as illustratively shown in FIG. 2B, a user of client terminal 102a having a user session on server 104 may access both device 240a as well as virtual device 240b' from the user session. Similarly, a user of client terminal 102b having a user session on server 104 may access both device 240b as well as virtual device 240a' from the user session. Finally, a user of client terminal 102c having a user session on server 104 may access both virtual device 240a' and 240b' from the user session.

Hence, the device virtualization described in relation to FIGS. 2A and 2B provides unrestricted access to devices 240 connected locally to client terminals 102 from any user session on server 104. As such, a redirected device on a terminal server 102 becomes a local device to the server and can be accessed by all the users' sessions connected to that server. For example a printer or a mass storage device, when redirected by one user connected through a session on the server, will show up as a local device and all the users can read/write the mass storage device and print using the printer.

While the unrestricted access enables users of client terminals 102 to share access to and use of devices 240, the device virtualization does not permit a user to restrict access to a device 240. In this respect, the unrestricted device virtualization does not permit secure or private access to the device 240. The device virtualization thus presents security and privacy concerns, as a device 240 may be accessed or used by any number of unauthorized users having user sessions on server 104. In order to address these security and privacy concerns, a device virtualization system may require that a device connected through a session only be accessible in that session.

A device virtualization system that addresses such security and privacy concerns has been developed, by providing a hook into a kernel of an operating system as described, for example, in U.S. patent application Ser. No. 13/287,982, filed on Nov. 2, 2011. However, in one aspect, methods which provide hooks into a kernel of an operating system will fail if the operating system implements features which protect the kernel from such hooks and other types of patches. For example, 64-bit versions of Windows operating system implement a feature called Kernel Patch Protection (KPP) which prevents hooks and patches on the kernel.

Figure 3A:
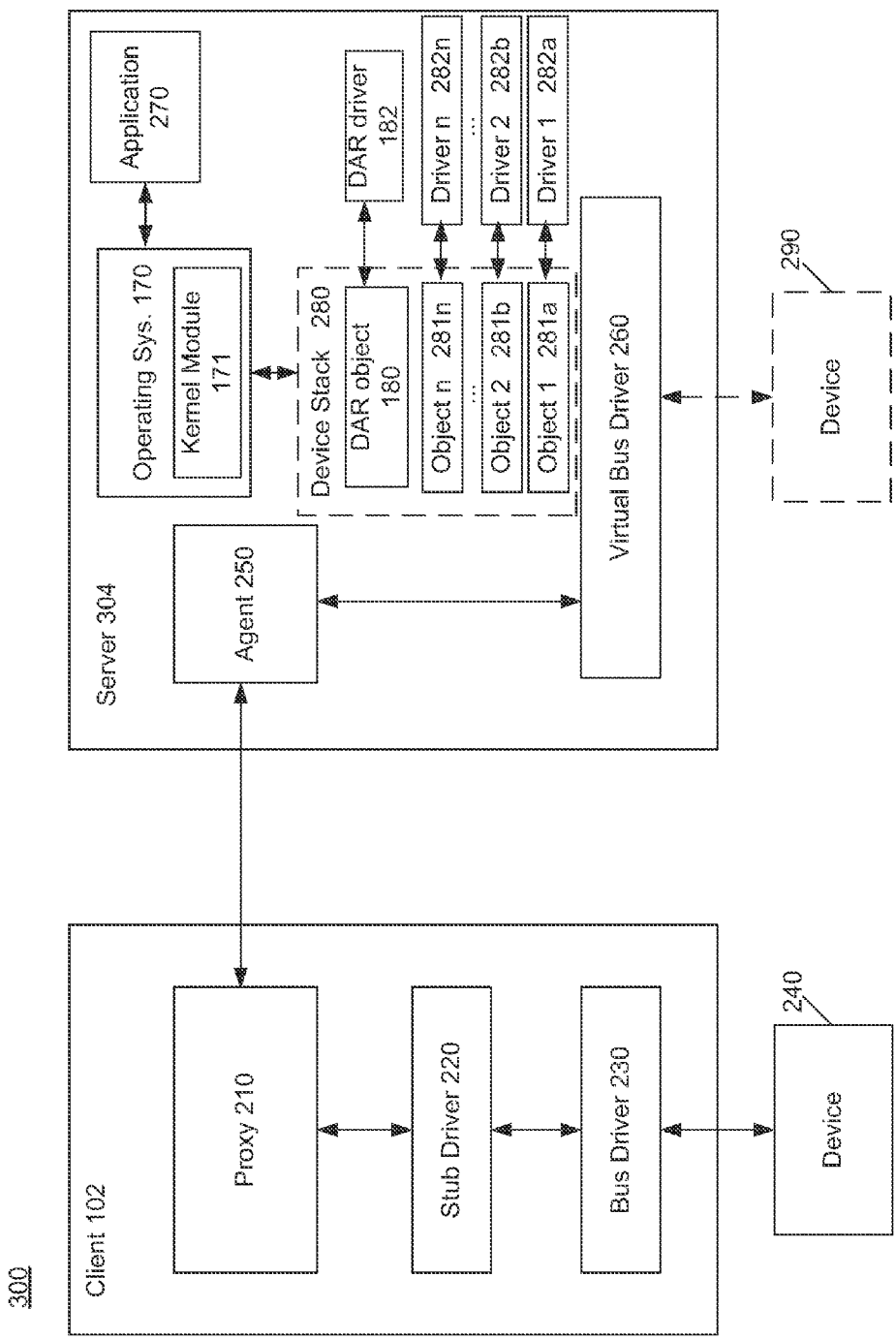
FIG. 3A is a conceptual block diagram of an example of a system for managing access to a device in a local device virtualization system.

In order to enable restricting access to a device in a local device virtualization system that implements features which prevent hooks and patches into the kernel, an enhanced server system is represented in FIG. 3A. FIG. 3A is a block diagram of a system 300. The system 300 may include a client 102 in communication with a server 304 over network 106 (illustrated in FIG. 1). The client 102, including proxy 210, stub driver 220, bus driver 230, and one or more optional device(s) 240, is substantially similar to the client 102 shown in and described in relation to FIG. 2A. The server 304 includes agent 250, virtual bus driver 260, device stack 280 including device objects 281a, 281b, . . . , 281n, device drivers 282a, 282b, . . . , 282n, operating system 170, application 270, and one or more optional virtualized device(s) 290, which function substantially similarly to the corresponding elements of server 104 of FIG. 2A. In one aspect, the operating system 170 includes the kernel module 171.

Server 304 additionally includes a Device Access Restriction object (DAR object) 180 at the top of the device stack 280. A Device Access Restriction driver (DAR driver) 182 creates and attaches the DAR object 180 at the top of the device stack 280. The DAR driver 182 is registered with the operating system 170 or the kernel module 171 as the upper filter driver for all selected class(es) of devices for which access restriction is to be made. When the DAR driver 182 determines that a device of the class for which the DAR driver is registered is redirected to the server 304, the DAR driver creates the DAR object 180 and attaches the DAR object at the top of the device stack 280.

Server 304 functions substantially similarly to server 104 (described in relation to FIG. 2A) in terms of loading drivers and device objects for device 240 on the server 304. However, as discussed above, the DAR driver 182 is registered as the upper filter driver for all the selected class(es) of devices for which access restriction is to be provided. For example, an image device class which includes webcams may be predetermined to be provided with access restriction. Such device classes may be predetermined by a user. When a device of the class, for which DAR driver 182 is registered, is plugged in, the DAR driver will be loaded and its add device routine may be called by the operating system 170. For example, in cases where the operating system 170 is a Windows system, a plug-and-play (PNP) component of Windows Kernel will call an add device routine of the DAR driver 182. Inside the add device routine, the DAR driver 182 receives the physical device object of the device stack 280 as an argument, which is used to verify that the device is a device redirected from the client 102 using the virtual bus driver 260. This verification is done by traversing the device stack 280 downward until the bottom of the stack is reached or the virtual bus driver 260 is found.

If the virtual bus driver 260 is found in the device stack 280, this signifies that the device is a redirected from the client 102 using the virtual bus driver. If the device is found to be redirected from the client 102, the DAR driver 182 creates the DAR object 180 and attaches it (as the top object) onto the device stack 280. However, if the bottom of the device stack 280 is reached and the virtual bus driver 260 is not found, this signifies that the device stack is not a device that is redirected from the client 102, and thus no access restriction is to be provided. If the device is not found to be redirected, then the DAR object 180 will not be attached on top of the device stack 280.

Since the DAR object 180 is attached to the top of the device stack 280, all requests for the redirected device are first received by the DAR object 180. Thus, the DAR object 180 can accept or reject the requests. For example, the DAR object 180 can thus restrict a redirected device to be only accessible from the user session (e.g., a Microsoft windows terminal server session) it is redirected from.

When a request is received at the DAR object 180, verification is made whether the request belongs to a process in the same session as that of the redirected device. If the request is from the session which is allowed to access the device (e.g., request is from the same session as the redirected device), then the request is forwarded to the original device driver down in the device stack 280. If the request belongs to a session which is not allowed access to the redirected device (e.g., request is from a session which is different from the session of the redirected device), then the request is rejected. If the request is rejected, an error may be returned to the requestor indicating that no such device exists. This error makes the applications running in different sessions believe that there is no such device present on the system.

In one aspect, a Microsoft terminal server technology and license can provide a way for many users to connect to the same server using the same user account or different user accounts. A device can be redirected to a terminal server, where many users may be connected. The device may only be accessible from the terminal session it was redirected from. All the other user sessions may be able to see the presence of the device using some tools, but may not be able to access the device. The DAR object 180 may thus keep the device access restricted to a session, which is redirected on the terminal server, and may thus only allow the access to the device to the terminal server session from which it is redirected. The session level restriction can enable the device to be accessed by the tools and processes which are executed in the same session, and/or to be accessed by tools and processes using windows supported interface to devices from the same session. From other users' sessions, however, the device may not be accessible to the tools or processes. By restricting access to the device such that access is only granted to the particular client/session the device is physically connected to/through, DAR object 180 provides private session-based access to the device. In addition, by verifying the identity of a session seeking to access the device through the symbolic link and by blocking unauthorized access to the device from unauthorized or unassociated user sessions, including both read access and write access, DAR object 180 provides secure access to the device.

Figure 3B:
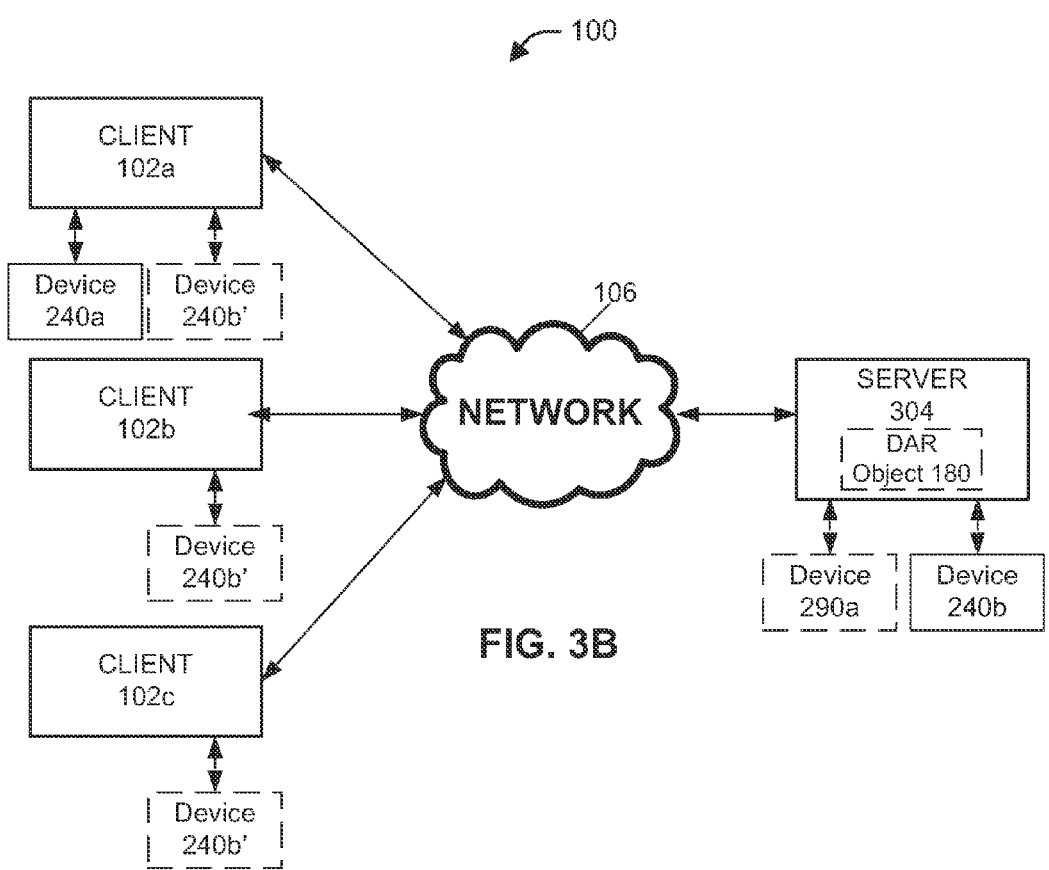
FIG. 3B is a conceptual block diagram of an example of a computer network providing managed access to virtualized local devices.

FIG. 3B shows a block diagram of a computer network 100 providing restricted access to virtualized local devices. As previously described in relation to FIG. 2B, network 100 includes client terminals 102a, 102b, and 102c communicating through network 106 with a server. Each client terminal can have one or more connected devices, such as device 240a connected to client terminal 102a, and device 240b connected to client terminal 102b.

Referring to FIGS. 3A and 3B, the server 304 is configured to provide managed access to virtualized local devices. As such, server 304 includes a Device Access Restriction (DAR) Driver 182 which is registered for the class of devices for which access restriction is to be provided on server 304, and attaches a DAR object 180 on top of the device stack 280 to manage access to the device 240. When device 240a is connected to client 102a, a corresponding virtualized device 290a is created on server 304. When the virtualized device 290a is created, if the device 240a is of a class for which the DAR driver is registered, the DAR driver 182 is loaded. DAR driver 182 traverses the device stack downwards to identify whether the device 240a is a redirected device, by finding the virtual bus driver 260 in the device stack. If the device 240a is identified as a redirected device, then device configuration data for the device 240a is obtained. The device configuration data may be stored, for example, at the virtual bus driver 260 or at a server registry stored in a memory of the server 304. The device configuration data stores any user configuration settings which may have been set for the device 240a. The device configuration data may include, for example, individual access restriction settings for this specific device. Specifically, even though the device 240a is determined to be a redirected device, the device configuration data may indicate that the device is not to be restricted. In such case, device 240a will not be restricted and the DAR object 180 will not be attached.

If the device 240a is identified as a redirected device and the obtained device configuration data allows for restricting access, then the DAR object 180 is attached to the top of the device stack. Since the DAR object 180 is attached on top of the device stack, all access requests to the device 240a is first received by the DAR object 180. The DAR object 180 determines whether the requests are received from the same session as that of the device 240a. In the example of FIGS. 3A and 3B, the device stack 280 of the device 240a includes the virtual bus driver 260 (signifying that the device 240a is a redirected device) and the DAR object 180 is attached on top of its device stack. Because the DAR object 180 is attached to the top of its device stack, the DAR objects manages the access requests such that device 240a is only accessible from client terminal 102a.

Rather than being connected to a client 102 and being redirected to the server 304 as a virtual device, device 240b may be physically connected to the server. As in the case of device 240a described above, when the device 240b is connected, if the device is of a class for which the DAR driver is registered, the DAR driver 182 is loaded. However, the DAR driver 182 will not find the virtual bus driver 260 within the device stack 280, since the device 240b is not a redirected device. Therefore, the DAR object 180 will not be attached to the top of the device stack. Because the DAR object 180 is not present, no access restriction is provided. Thus device 240b is accessible from all user sessions running on client terminals 102a, 102b, and 102c as device 240b'.

In one aspect, after a device 240 (e.g., 240a) is identified as a redirected device and a DAR object 180 is attached on top of the device stack 280 as discussed above, extra steps may be performed to provide additional access restriction to the device. After the DAR object 180 is attached on top of the device stack 280, the DAR driver 182 traverses the device stack to search for all symbolic links to all the device objects 281 in the device stack which are created in the global namespace of the OMN of the server 304. Such symbolic links are moved to the local namespace of the OMN for the session in which the device 240 is redirected. As discussed above, the symbolic links stored in the local namespace for a specific session is only accessible by processes belonging to the same session. Therefore, users accessing the server 304 on a session which is different from the session in which the device 240 is redirected cannot see, and/or have access to, the device 240. Searching for the symbolic links in the global namespace and moving them to the local namespace may be repeated multiple times, whenever it is determined that the device drivers 282 corresponding to the device objects 281 in the device stack 280 is likely to create a new device interface in the global namespace.

A record of all device interfaces that are moved are kept so that when the device 240 is removed, the local namespace for the session of the device 240 may be cleaned up.

In one aspect, for certain types of devices, requests made by a process belonging to a session may not be sent to the DAR object 180 through the same session. For example, operating systems such as, for example, Windows, implement an architecture under which all the print requests are first sent to a service called spooler, and which are then sent to the printer device. FIG. 4C shows a block diagram of an example of a printer architecture that may be implemented at a local device virtualization system. When an application 470 (e.g., application 270 of FIG. 2A or 3A) issues a print request, the print request is sent to a graphics device interface (GDI) 480 and to a spooler service 490. The GDI 480 provides graphics support for generating data which may be received by the spooler service 490 for fulfilling the print request. The spooler service 490 receives the print request from the application 470 and the data generated by the GDI 480, and sends the print request and the data generated by the GDI 480 to a printer. The printer receives the print request and the data generated by the GDI 480, and fulfills the print request.

However, the spooler service 490, under certain implementations such as, for example, under Windows, runs in a predetermined session (e.g., session 0). Therefore, all the requests coming to printer device will appear to be coming from the predetermined session, regardless of the session of the original process which had originally sent the print request. However, the DAR object 180 as discussed above with reference to FIGS. 3A and 3B allows only those requests coming from the same session as that in which the device is redirected. Therefore, in the example of Windows, all the print requests, which are coming from the predetermined session (e.g., session 0) regardless of the session of the original processes sending the print requests, will likely be rejected, and the printer device will be unusable. On the other hand, if an exception is made to the DAR object 180 and all requests coming in from the predetermined session on which the spooler service 490 runs (e.g., session 0) is allowed access to the printer device, any requests made by any session will be granted access and access restriction may not be provided. The descriptions made in this paragraph may also apply to other devices for which access requests are routed through a service running on a predetermined session.

Therefore, in another aspect, similar to the aspect discussed above, after the DAR object 180 is attached to the device stack 280, all symbolic links stored in the global namespace of the OMN corresponding to the device objects 281 of the device stack 280 are moved to the local namespace for the session in which the device is redirected. In addition, when the DAR object 180 receives a request, in addition to allowing requests from the same session as that in which the device is redirected, all requests from a predetermined session (e.g., session 0 for printers on Windows) will also be allowed. By moving the symbolic links to the local namespace and having the DAR object 180 also allow requests from a predetermined session, access restriction can also be provided for the types of devices (e.g., printer devices) for which all requests are sent by a predetermined session.

In this aspect, using a printer device on Windows as an example, when the print spooler service (e.g., spooler service 490) gets a print request from a session other than the session in which the printer device is redirected, the spooler service will search for the printer device interface first in the session's local namespace, and then global namespace. However, the spooler service will not find the printer device interface in the local namespace since the request is from a different session. Also, the spooler service will not find the printer device interface in the global namespace since all the device interfaces for the printer have been moved to the local namespace for the session of the printer. Therefore, this request will wait in the print queue until the user in this session redirects a printer, or a printer is physically connected to the server.

If the spooler service receives a print request from the same session as that of the printer, the spooler service also searches for the printer device interface, first in the local namespace for the session. However, in this case, since the request is made by the same session as that of the printer, the spooler service will find the printer device interface. Using the printer device interface, the spooler service will send a print request to the printer's device stack 280 through session 0. The DAR object 182 of the device stack 280 will receive the request and allow the request, since it is coming from session 0.

Figure 4A:
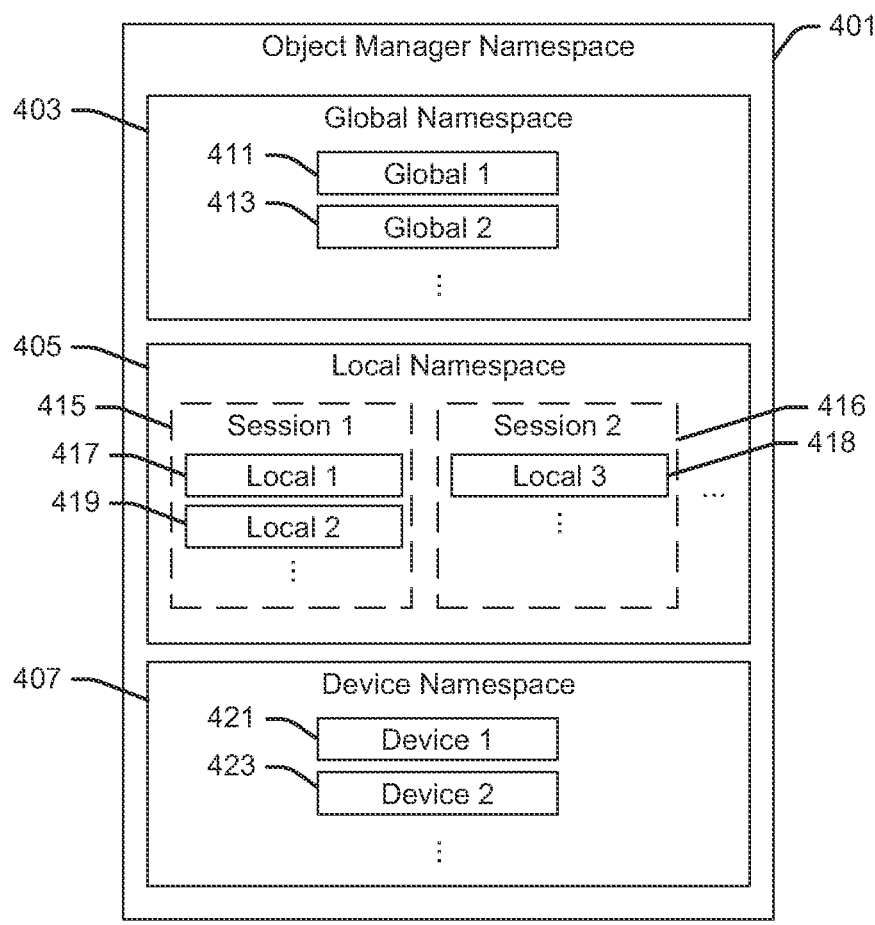
FIG. 4A is a conceptual block diagram of an example of a data structure for storing an object manager namespace.
Figure 4B:
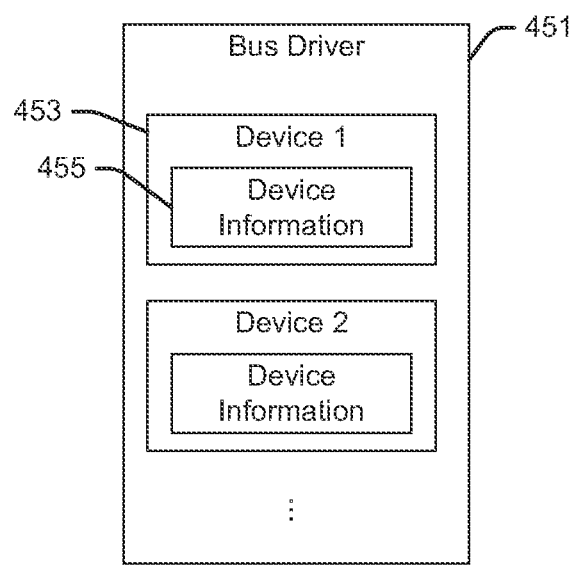
FIG. 4B is a conceptual block diagram of an example of a data structure for storing device configuration data of a virtual bus driver.
Figure 4C:
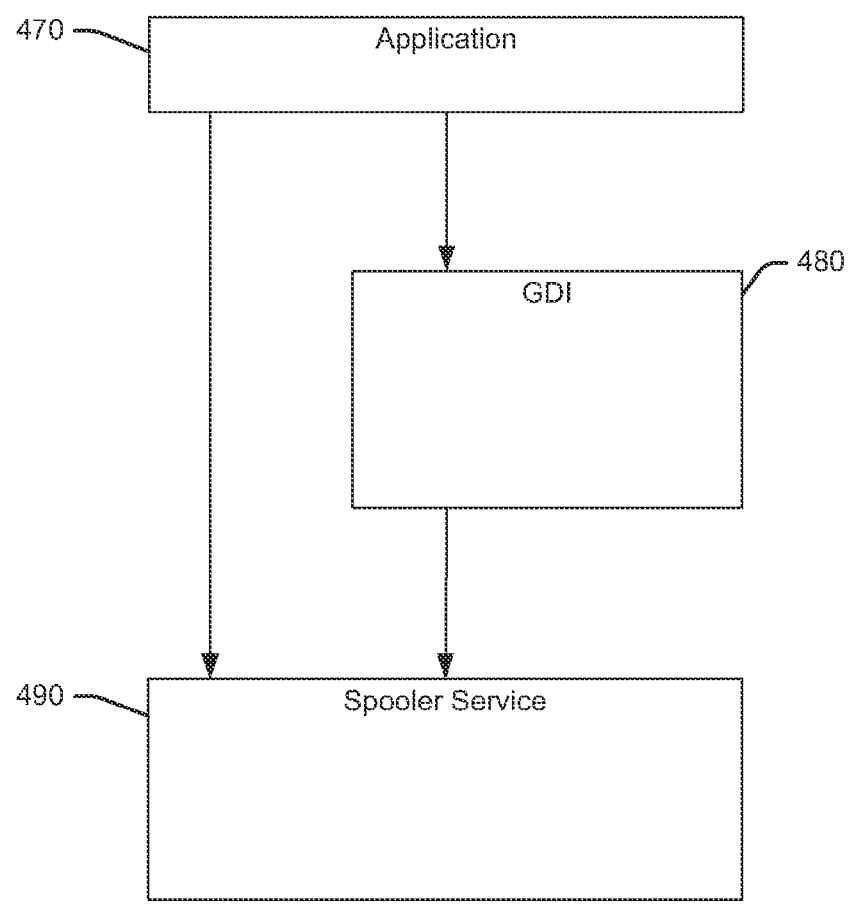
FIG. 4C is a conceptual block diagram of an example of a printer architecture which may be implemented in a local device virtualization system.

FIGS. 4A and 4B respectively show data structures for storing an object manager namespace 401 and device configuration data of a virtual bus driver 451, in accordance with various aspects of the subject technology.

FIG. 4A illustratively shows a data structure for storing an object manager namespace 401 of server 304. The data structure is generally resident in and stored in a memory of server 304. For example, object manager namespace 401 may be stored in a random access memory of server 304. The Object Manager Namespace 401 stores records for devices, applications, and/or other components or objects that are running on or accessible from an associated operating system (such as operating system 170) or computer (such as server 304). The records contained in the Object Manager Namespace 401 are organized in one or more of a global namespace 403, a local namespace 405, and a device namespace 407. The records in the global namespace 403 and local namespace 405 may include symbolic links which point to device objects (e.g., device objects for the devices, applications and/or other components running on or accessible from the associated operating system or computer). Global namespace 403 includes records or entries 411, 413 that point to device objects that are shared between all user sessions on the operating system or computer. As such, devices, applications, or other objects having corresponding entries in the global namespace can receive access requests by any user, or from any user session, on the operating system 170 or computer (e.g., server 304). Local namespace 405 includes records or entries 417, 418, 419 that point to device objects that are specific to one or more user sessions on the operating system or computer. As such, devices, applications, or other objects having corresponding entries in the local namespace can only be accessed by the particular session(s) that they are associated with. In the example of FIG. 4A, for example, records or entries 417 and 419 are associated with a first user session 415, while record or entry 418 is associated with a different user session 416. Finally, device namespace 407 includes records or entries 421, 423 for all device objects that are running on or accessible from the operating system or computer. As such, the symbolic links from global namespace 403 or local namespaces 405 points to device object entries in the device namespace 407. In an aspect of the subject technology, the device objects may be created and stored in a location other than a device namespace 407.

FIG. 4B illustratively shows data structure 451 for storing device configuration data of a virtual bus driver, such as virtual bus driver 260 of FIGS. 2A and 3A. The data structure 451 is generally resident in and stored in a memory of the server 104, 304 associated with the virtual bus driver. The data structure 451 can include a record or entry 453 for each virtualized device connected to or resident on the virtual bus. Each entry 453 stores device information 455 associated with the corresponding virtualized device. The device information can include a physical address for the device, one or more session identifiers associated with the device (e.g., a session LUID or session number), a device descriptor (e.g., product ID, vendor ID, and/or other information), a configuration descriptor, an interface descriptor, an endpoint descriptor and/or a string descriptor. The device information can also include device configuration data, such as the device configuration data used to determine whether a device should be restricted.

Figure 5:
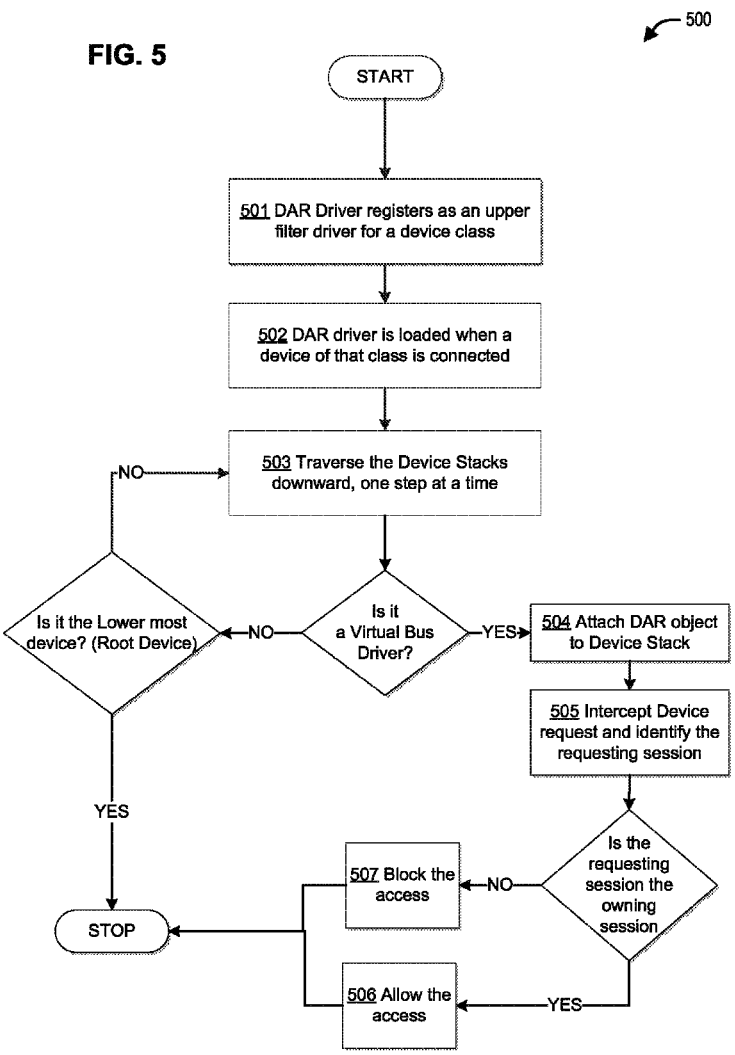
FIG. 5 is a flowchart illustrating an exemplary method for managing access to a device.

FIG. 5 is a flowchart illustrating an exemplary method 500 for managing access to a device, in accordance with various aspects of the subject technology. Method 500 can be implemented by one or more processors on server 304, for example.

Method 500 begins with operation 501, in which the DAR driver 182 registers itself as an upper filter driver for the class of devices which access restriction is to be provided. This operation allows the DAR driver 182 to be loaded for each class of device for which a user wishes to manage access restriction. In step 502, when a device of the class for which the DAR driver 182 is registered is plugged in, the DAR driver 182 will be loaded and its add device routine will be called. For example, the plug-and-play (PNP) component of Windows Kernel will load the DAR driver 182 and call its add device routine. When the add device routine is called, a physical device object associated with the current device stack is passed in as an argument to the add device routine.

In step 503, the DAR driver 182 traverses the device stack 280 downwards and checks if it finds the virtual driver 260. For example, the DAR driver 182 uses the physical device object that is passed in as an argument to the add device routine, and checks if the device stack 280 ends at a device object 281 which is created by the virtual bus driver 260. The presence of the device object 281 created by the virtual bus driver 260 signifies that the device is a redirected device.

If the virtual bus driver 260 is found, the device configuration from the virtual bus driver is received, and the device configuration is checked to determine if the user has configured the access to the device to be restricted to the session of the device.

If yes, in step 504, the DAR object 180 is created and attached to the device stack 280. Since the DAR object 180 is attached to the top of the device stack 280, the DAR object will be the first object in the device stack to receive access requests to the device.

If the virtual driver 260 is not found until the bottom of the device stack 280 is reached, or if the device is configured such that access to the device is not restricted to the session of the device, then the DAR object 180 is not attached and the method ends.

In step 505, when a process makes a device request, this request will be intercepted by the DAR object 180 and the requesting process's session is identified.

If the requesting session is the device's own session, in step 506, access is allowed, and the request is passed down to the rest of the device stack 280 to the device object which may respond to the request.

However, if the requesting session is not the session which is allowed to access the device (e.g., requesting session is not the device's own session), then in step 507, access to the devices is blocked. If the access is blocked, an error may be returned back to the requesting process, indicating that no such device exists.

Figure 6:
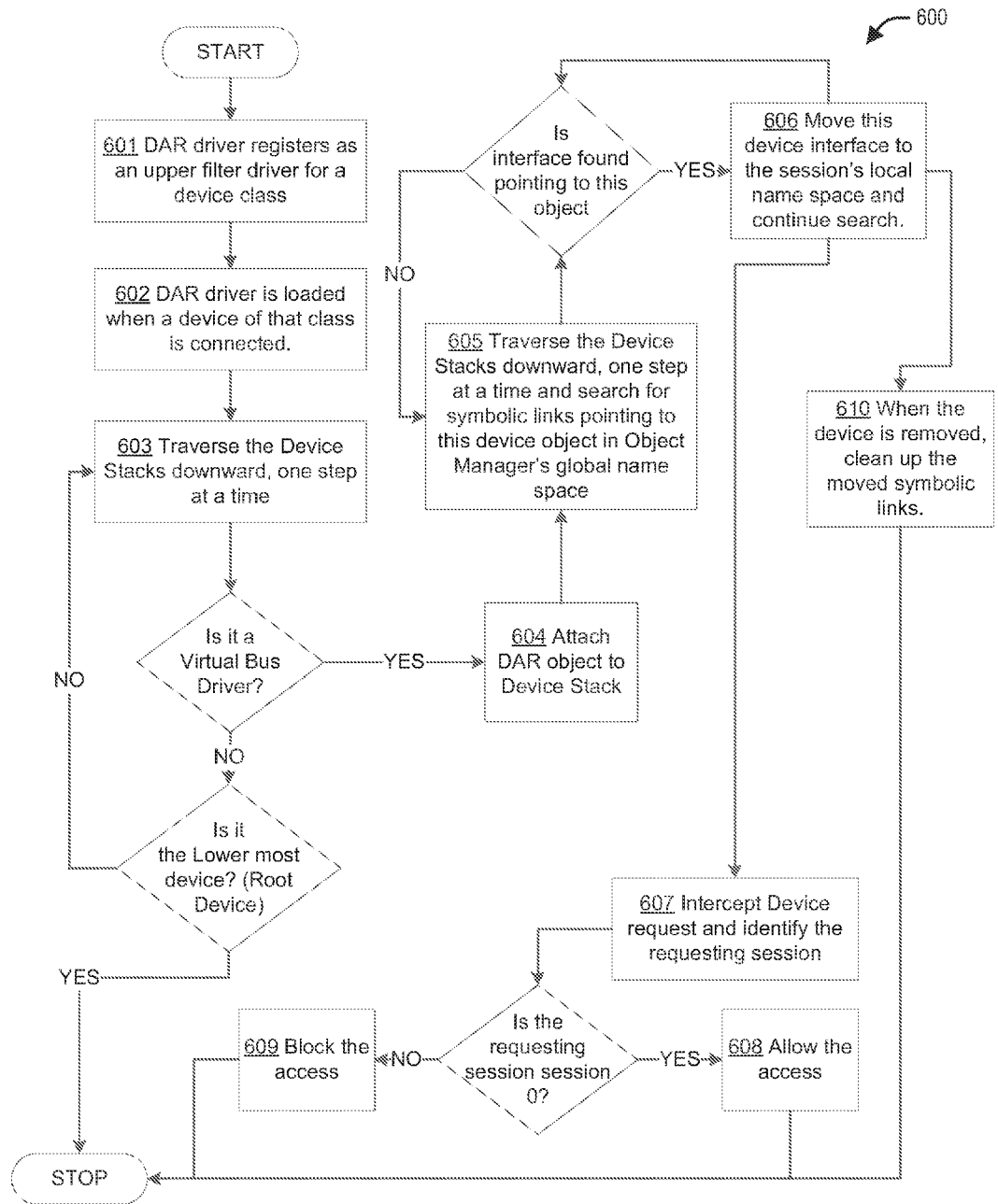
FIG. 6 is a flowchart illustrating an exemplary method for managing access to a device for which requests are sent from a single session.

FIG. 6 is a flowchart illustrating another exemplary method 600 for managing access to a device, for which requests are sent from a single session, in accordance with various aspects of the subject technology. Requests that are sent from a single session may be sent, for example, by the spooler service 490 as described with reference to FIG. 4C, which receives a print request from an application (e.g., application 270) and sends the print request to a printer. Method 600 can be implemented by one or more processors on server 304, for example.

Method 600 begins with operation 601 in which the DAR driver 182 is registered as the upper filter driver for a device class. This operation allows the DAR driver 182 to be loaded for each class of device for which a user wishes to manage access restriction. In step 602, when a device of the class for which the DAR driver 182 is registered is plugged in, the DAR driver 182 will be loaded and its add device routine will be called. For example, the plug-and-play (PNP) component of Windows Kernel will load the DAR driver 182 and call its add device routine. When the add device routine is called, a physical device object associated with the current device stack is passed in as an argument to the add device routine.

In step 603, the DAR driver 182 traverses the device stack 280 downwards and checks if it finds the virtual bus driver 260. For example, the DAR driver 182 uses the physical device object that is passed in as an argument to the add device routine, and checks if the device stack 280 ends at a device object 281 which is created by the virtual bus driver 260. The presence of the device object 281 created by the virtual bus driver 260 signifies that the device is a redirected device.

If the virtual bus driver 260 is found, the device configuration from the virtual bus driver is received, and the device configuration is checked to determine if the user has configured the access to the device to be restricted to the session of the device.

If yes, in step 604, the DAR object 180 is created and attached to the device stack 280. Since the DAR object 180 is attached to the top of the device stack 280, the DAR object will be the first object in the device stack to receive access requests to the device.

If the virtual bus driver 260 is not found until the bottom of the device stack 280 is reached, or if the device is configured such that access to the device is not restricted to the session of the device, then the DAR object 180 is not attached and the method ends.

In operation 605, the DAR driver 182 searches for all the symbolic links in the global namespace of the object manager namespace pointing to any device objects 281 in the entire device stack 280 for the device. The symbolic links are searched for each of the device object 281. If a device interface is found, in step 606, it is moved to local namespace for the session of the device.

Since the symbolic links for the device objects 281 are moved to the local namespace for the session, processes which belong to a session other than the session of the device will not be able to find the symbolic links to the device objects 281 of the device.

In step 607, requests for the device are intercepted by the DAR object 180 and the requesting process's session is identified. For a certain type of device (e.g., printer), all the requests will first be sent to a service (e.g., spooler service 490) which runs on a predetermined session (e.g., session 0). Therefore, all requests to the device will come from the predetermined session and the requests from such predetermined session will be allowed, even though the request did not come from the session of the device. The requests received from the session of the device are also allowed. If the identified session in operation 607 is the predetermined session or the session of the device, in step 608, the request is allowed. If the request identified in operation 607 is not the predetermined session or the session of the device, then, in step 609, the request is blocked.

In addition, when the device has been removed from the server (e.g., device has been unplugged at the client from which it was redirected), in step 610, the local namespace of the session of the device is cleaned to remove the symbolic links which had been copied from the global namespace.

Figure 7:
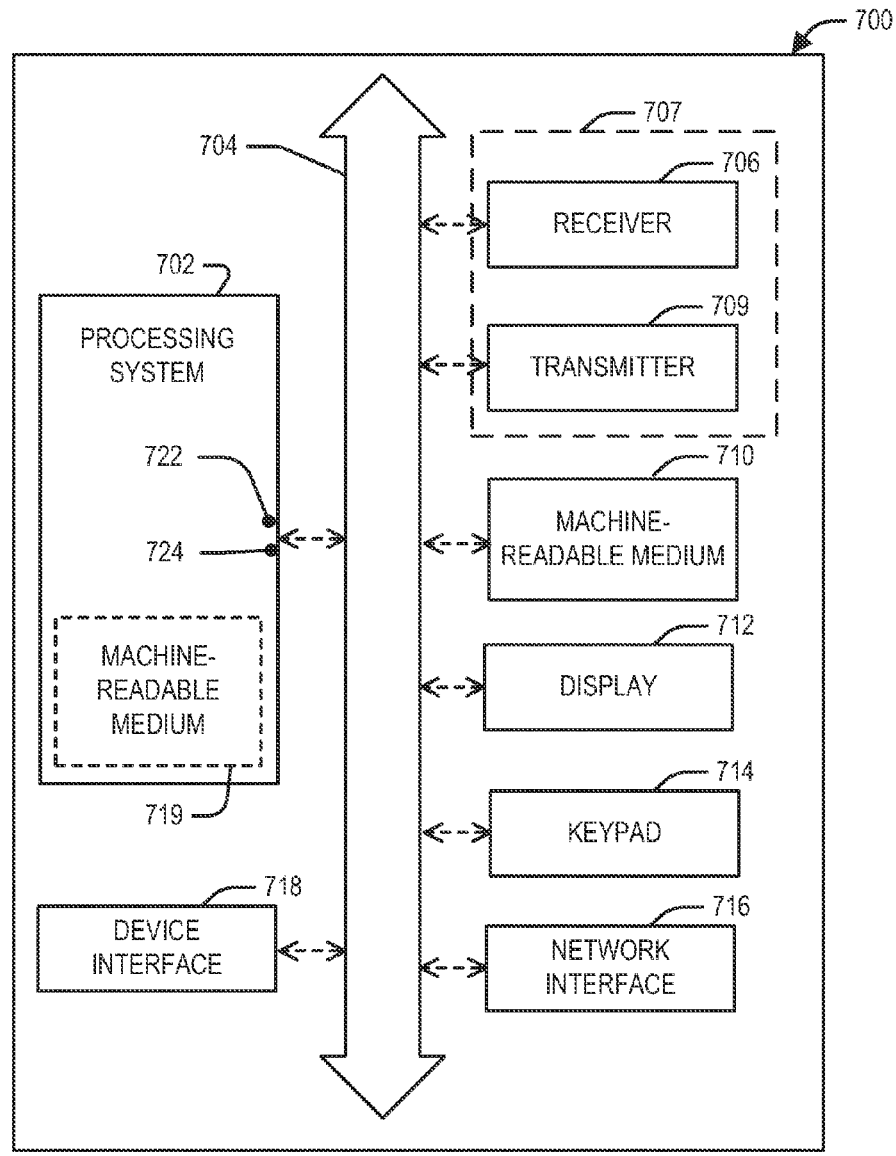
FIG. 7 is a conceptual block diagram illustrating an example system in accordance with various aspects of the subject technology.

FIG. 7 is a conceptual block diagram illustrating an example of a system 700, in accordance with various aspects of the subject technology. The system 700 may be, for example, a client 102 (e.g., client 102*a*, 102*b*, 102*c*) or a server 104/304.

The system 700 includes a processing system 702. The processing system 702 is capable of communication with a receiver 706 and a transmitter 709 through a bus 704 or other structures or devices. It should be understood that communication means other than busses can be utilized with the disclosed configurations. The processing system 702 can generate audio, video, multimedia, and/or other types of data to be provided to the transmitter 709 for communication. In addition, audio, video, multimedia, and/or other types of data can be received at the receiver 706, and processed by the processing system 702.

The processing system 702 may include a general-purpose processor or a specific-purpose processor for executing instructions and may further include a machine-readable medium 719, such as a volatile or non-volatile memory, for storing data and/or instructions for software programs. The instructions, which may be stored in a machine-readable medium 710 and/or 719, may be executed by the processing system 702 to control and manage access to the various networks, as well as provide other communication and processing functions. The instructions may also include instructions executed by the processing system 702 for various user interface devices, such as a display 712 and a keypad 714. For the example of a client 102, the display 712 may be used to locally display the virtual desktop environment at the client 102, and the keypad 714 may be used to receive user input command, which may be forwarded to the server 104/304 over the network 106. The processing system 702 may include an input port 722 and an output port 724. Each of the input port 722 and the output port 724 may include one or more ports. The input port 722 and the output port 724 may be the same port (e.g., a bi-directional port) or may be different ports.

The processing system 702 may be implemented using software, hardware, or a combination of both. By way of example, the processing system 702 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, any other suitable device that can perform calculations or other manipulations of information, or a portion(s) or a combination(s) of any of the foregoing. A processor may include one or more processors.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

A non-transitory machine-readable medium include one or more volatile memories and/or one or more non-volatile memories.

Machine-readable media (e.g., 719) may include storage integrated into a processing system, such as might be the case with an ASIC. Machine-readable media (e.g., 710) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 702. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a client terminal or server or by a processing system of a client terminal or server. Instructions can be, for example, a computer program including code.

A network interface 716 may be any type of interface to a network (e.g., an Internet network interface) and may reside between any of the components shown in FIG. 7. For the example of a client 102, the network interface 716 may be used to send user commands and responses from the device 240 to the server 104/304 over the network 106, and to receive display data (e.g., display data for the virtual desktop) and instructions (e.g., string descriptor requests) from the server 104/304 over the network 106.

A device interface 718 may be any type of interface to a device and may reside between any of the components shown in FIG. 7. A device interface 718 may, for example, be an interface to an external device (e.g., USB device) that plugs into a port (e.g., USB port) of the system 700. For the example of a client 102, the bus driver 230 may be configured to detect the presence of a device 240 connected to the client 102 via the device interface 718, and to read device information (e.g., device descriptor) from the device 240 via the device interface 718 to identify the device 240.

A transceiver block 707 may represent one or more transceivers, and each transceiver may include a receiver 706 and a transmitter 709. A functionality implemented in a processing system 702 may be implemented in a portion of a receiver 706, a portion of a transmitter 709, a portion of a machine-readable medium 710, a portion of a display 712, a portion of a keypad 714, or a portion of an interface 716, and vice versa.

For the example of a client 102, the bus driver 230 may be implemented by the processing system 702, the device interface 718, the machine-readable medium 710 or any combination thereof and the proxy 210 may be implemented by the processing system 702, the network interface 716, the machine-readable medium 710 or any combination thereof. The stub driver 220 may be implemented by the processing system 702, the machine-readable medium 710 or any combination thereof. For example, the machine-readable medium 710 may comprise software programs that may be executed by the processing system 702 to realize various functions of the bus driver 230, stub driver 220 and the proxy 210.

For the example of a server 104/304, the virtual bus driver 260, device stack 280, DAR driver 182, and application 270 may be implemented by the processing system 702, the machine-readable medium 710 or any combination thereof, and the agent 250 may be implemented by the network interface 716, the processing system 702, the machine-readable medium 710 or any combination thereof.

Illustration of Apparatus/Method/Machine Readable Storage Medium for Providing Management of Access Requests to a Redirected Device from a Predetermined Session (Described as Clauses)

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

1. A method (see, e.g., 800-A in FIG. 8A) for managing access requests to a device, the method comprising:

determining that a device stack corresponds to the device that is remote to the server and is connected locally to a client that is remote to the server, the device stack comprising one or more device objects (see, e.g., 802-A in FIG. 8A);

attaching a device access restriction object on top of the device stack (see, e.g., 804-A in FIG. 8A);

facilitating restriction of access to the one or more device objects from sessions different from a session associated with the each device (see, e.g., 806-A in FIG. 8A);

receiving, at the device access restriction object, an access request to the device (see, e.g., 808-A in FIG. 8A); and determining, at the device access restriction object, whether the access request is allowed access to the device (see, e.g., 810-A in FIG. 8A).

2. The method according to clause 1, wherein the facilitating restriction of access to the one or more device objects comprises:

for each of the device objects in the device stack, determining whether a corresponding symbolic link exists in a global namespace of an object manager namespace (OMN) and moving the symbolic link to a local namespace of the OMN.

3. The method according to clause 1, wherein the determining whether the access request is allowed access to the device comprises:

determining whether a session from which the access request is received is a predetermined session; and determining that the access request is allowed if the session from which the access request is received is the predetermined session.

4. The method according to clause 1, wherein the determining whether the access request is allowed access to the device comprises:

determining whether a session from which the access request is received is the same as a session of the client; and determining that the access request is allowed if the session from which the access request is received is the same as the session of the client.

5. The method according to clause 1, wherein if the access request is not allowed, generating an error message indicating that the device does not exist.

6. The method according to clause 1, wherein the determining that the device stack corresponds to the device that is remote to the server comprises facilitating traversing the device stack downwards to identify a device object corresponding to a virtual bus driver at the bottom of the device stack.

7. The method according to clause 1, further comprises determining whether the device is configured to be provided with access restriction, wherein the attaching the access restriction object comprises:

attaching the access restriction object on top of the device stack if the device is configured to be provided with access restriction.

8. The method according to clause 1, wherein the method is performed without hooking to a kernel module.

9. The method according to clause 1, wherein the device is a USB device.

10. The method according to clause 1, wherein the access request is made by a process of an application, and wherein receiving the access request to the device comprises:

intercepting the access request made by the process to the device.

11. A machine-readable storage medium (see, e.g., 800-B in FIG. 8B) encoded with instructions executable by one or more processors to perform one or more operations, the one or more operations comprising:

determining, at a server, that a device stack corresponds to the device that is remote to the server and is connected locally to a client that is remote to the server, the device stack comprising one or more device objects (see, e.g., 802-B in FIG. 8B);

attaching a device access restriction object on top of the device stack (see, e.g., 804-B in FIG. 8B);

facilitating restriction of access to the one or more device objects from sessions different from a session associated with the each device (see, e.g., 806-B in FIG. 8B);

receiving, at the device access restriction object, an access request to the device (see, e.g., 808-B in FIG. 8B); and determining, at the device access restriction object, whether the access request is allowed access to the device (see, e.g., 810-B in FIG. 8B).

12. The machine-readable storage medium according to clause 11, wherein the facilitating restriction of access to the one or more device objects comprises:

for each of the device objects in the device stack, determining whether a corresponding symbolic link exists in a global namespace of an object manager namespace (OMN) and moving the symbolic link to a local namespace of the OMN.

13. The machine-readable storage medium according to clause 11, wherein the determining whether the access request is allowed access to the device comprises:

determining whether a session from which the access request is received is a predetermined session; and determining that the access request is allowed if the session from which the access request is received is the predetermined session.

14. The machine-readable storage medium according to clause 11, wherein the determining whether the access request is allowed access to the device comprises:

determining whether a session from which the access request is received is the same as a session of the client; and determining that the access request is allowed if the session from which the access request is received is the same as the session of the client.

15. The machine-readable storage medium according to clause 11, wherein if the access request is not allowed, generating an error message indicating that the device does not exist.

16. The machine-readable storage medium according to clause 11, wherein the determining that the device stack corresponds to the device that is remote to the server comprises facilitating traversing the device stack downwards to identify a device object corresponding to a virtual bus driver at the bottom of the device stack.

17. The machine-readable storage medium according to clause 11, wherein the one or more operations further comprise determining whether the device is configured to be provided with access restriction, wherein the attaching the access restriction object comprises:

attaching the access restriction object on top of the device stack if the device is configured to be provided with access restriction.

18. The machine-readable storage medium of clause 11, wherein the one or more operations are performed without hooking to a kernel module.

19. The machine-readable storage medium according to clause 11, wherein the device is a USB device.

20. The machine-readable storage medium of clause 11, wherein the access request is made by a process of an application, and wherein receiving the access request to the device comprises:

intercepting the access request made by the process to the device.

21. An apparatus (see, e.g., 800-C in FIG. 8C), comprising:
one or more modules configured to perform one or more operations comprising:

determining, at a server, that a device stack corresponds to the device that is remote to the server and is connected locally to a client that is remote to the server, the device stack comprising one or more device objects (see, e.g., 802-C in FIG. 8C);

attaching a device access restriction object on top of the device stack (see, e.g., 804-C in FIG. 8C);

facilitating restriction of access to the one or more device objects from sessions different from a session associated with the each device (see, e.g., 806-C in FIG. 8C);

receiving, at the device access restriction object, an access request to the device (see, e.g., 808-C in FIG. 8C); and determining, at the device access restriction object, whether the access request is allowed access to the device (see, e.g., 810-C in FIG. 8C).

22. The apparatus according to clause 21, wherein the facilitating restriction of access to the one or more device objects comprises:

for each of the device objects in the device stack, determining whether a corresponding symbolic link exists in a global namespace of an object manager namespace (OMN) and moving the symbolic link to a local namespace of the OMN.

23. The apparatus according to clause 21, wherein the determining whether the access request is allowed access to the device comprises:

determining whether a session from which the access request is received is a predetermined session; and determining that the access request is allowed if the session from which the access request is received is the predetermined session.

24. The apparatus according to clause 21, wherein the determining whether the access request is allowed access to the device comprises:

determining whether a session from which the access request is received is the same as a session of the client; and determining that the access request is allowed if the session from which the access request is received is the same as the session of the client.

25. The apparatus according to clause 21, wherein if the access request is not allowed, generating an error message indicating that the device does not exist.

26. The apparatus according to clause 21, wherein the determining that the device stack corresponds to the device that is remote to the server comprises facilitating traversing the device stack downwards to identify a device object corresponding to a virtual bus driver at the bottom of the device stack.

27. The apparatus according to clause 21, wherein the one or more operations further comprise determining whether the device is configured to be provided with access restriction, wherein the attaching the access restriction object comprises:

attaching the access restriction object on top of the device stack if the device is configured to be provided with access restriction.

28. The apparatus according to clause 21, wherein the method is performed without hooking to a kernel module.

29. The apparatus according to clause 21, wherein the device is a USB device.

30. The apparatus according to clause 21, wherein the access request is made by a process of an application, and wherein receiving the access request to the device comprises:

intercepting the access request made by the process to the device.

31. An apparatus (see, e.g., 800-C in FIG. 8C), comprising:
means for determining, at a server, that a device stack corresponds to the device that is remote to the server and is connected locally to a client that is remote to the server, the device stack comprising one or more device objects (see, e.g., 802-C in FIG. 8C);

means for attaching a device access restriction object on top of the device stack (see, e.g., 804-C in FIG. 8C);

means for facilitating restriction of access to the one or more device objects from sessions different from a session associated with the each device (see, e.g., 806-C in FIG. 8C);

receiving, at the device access restriction object, an access request to the device (see, e.g., 808-C in FIG. 8C); and means for determining, at the device access restriction object, whether the access request is allowed access to the device (see, e.g., 810-C in FIG. 8C).

32. The apparatus according to clause 31, wherein the means for facilitating restriction of access to the one or more device objects comprises:

means for determining, for each of the device objects in the device stack, whether a corresponding symbolic link exists in a global namespace of an object manager namespace (OMN) and moving the symbolic link to a local namespace of the OMN.

33. The apparatus according to clause 31, wherein the means for determining whether the access request is allowed access to the device comprises:

means for determining whether a session from which the access request is received is a predetermined session; and means for determining that the access request is allowed if the session from which the access request is received is the predetermined session.

34. The apparatus according to clause 31, wherein the means for determining whether the access request is allowed access to the device comprises:

means for determining whether a session from which the access request is received is the same as a session of the client; and means for determining that the access request is allowed if the session from which the access request is received is the same as the session of the client.

35. The apparatus according to clause 31, further comprising means for generating an error message indicating that the device does not exist, if the access request is not allowed.

36. The apparatus according to clause 31, wherein the means for determining that the device stack corresponds to the device that is remote to the server comprises means for facilitating traversing the device stack downwards to identify a device object corresponding to a virtual bus driver at the bottom of the device stack.

37. The apparatus according to clause 31, further comprising means for determining whether the device is configured to be provided with access restriction, wherein the means for attaching the access restriction object comprises:

means for attaching the access restriction object on top of the device stack if the device is configured to be provided with access restriction.

38. The apparatus according to clause 31, wherein the means for determining whether the access request is allowed access to the device comprises:

means for determining whether the access request is allowed access to the device without hooking to a kernel module.

39. The apparatus according to clause 31, wherein the device is a USB device.

40. The apparatus according to clause 31, wherein the access request is made by a process of an application, and wherein the means for receiving the access request to the device comprises:

means for intercepting the access request made by the process to the device.

41. The method, machine-readable storage medium, or apparatus of any of the foregoing clauses, wherein the session is a predetermined session.

Other Remarks

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., client 102a, 102b, 102c, server 104/304, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (e.g., hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (e.g., one or more of blocks, modules, elements, components or processors), it is understood that such actions or functions may be performed, for example, by the item directly. In another example, when an item is described as performing an action, the item may be understood to perform the action indirectly, for example, by facilitating such an action (e.g., assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (e.g., performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Terms such as top, bottom, upward, downward and the like, if used in this disclosure, should be understood as referring to an arbitrary frame of orientation. For example, a top according to one orientation may be a bottom or a side in another orientation. Also, a top may be a portion of top layers, if there are multiple layers.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules. For example, a local link creation module and a local link deletion module may be combined into one module. A hook module and an intercept module may be combined into one module. A device identification module and a stack traverse module may be combined into one module. In another example, these modules may be divided into a larger number of modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A method for managing access requests to a device, the method comprising:

storing a device stack in a memory of a server, the device stack comprising one or more device objects, each device object associated with a device driver and comprising a software implementation of a device;

determining, at the server, that the device stack corresponds to the device that is remote to the server and is connected locally to a client that is remote to the server;

facilitating traversing the device stack downwards to identify a device object corresponding to a virtual bus driver at the bottom of the device stack;

attaching a device access restriction object on top of the device stack;

facilitating restriction of access to the one or more device objects from sessions different from a session associated with the device;

receiving, at the device access restriction object, an access request to the device; and determining, at the device access restriction object, whether the access request is allowed access to the device.

2. The method according to claim 1, wherein the facilitating restriction of access to the one or more device objects comprises:

for each of the one or more device objects in the device stack, determining whether a corresponding symbolic link exists in a global namespace of an object manager namespace (OMN) and moving the symbolic link to a local namespace of the OMN.

3. The method according to claim 1, wherein the determining whether the access request is allowed access to the device comprises:

determining whether a session from which the access request is received is a predetermined session; and determining that the access request is allowed if the session from which the access request is received is the predetermined session.

4. The method according to claim 1, wherein the determining whether the access request is allowed access to the device comprises:

determining whether a session from which the access request is received is the same as a session of the client; and determining that the access request is allowed if the session from which the access request is received is the same as the session of the client.

5. The method according to claim 1, comprising: if the access request is not allowed, generating an error message indicating that the device does not exist.

6. The method according to claim 1, comprises determining whether the device is configured to be provided with access restriction, wherein the attaching the access restriction object comprises:

attaching the access restriction object on top of the device stack if the device is configured to be provided with access restriction.

7. The method according to claim 1, wherein the method is performed without hooking to a kernel module.

8. The method according to claim 1, wherein the device is a USB device.

9. The method according to claim 1, wherein the access request is made by a process of an application, and wherein receiving the access request to the device comprises:

intercepting the access request to the device made by the process.

10. A non-transitory machine-readable storage medium encoded with instructions executable by one or more processors to perform one or more operations, the one or more operations comprising:

storing a device stack in a memory of a server, the device stack comprising one or more device objects, each device object associated with a device driver and comprising a software implementation of a device;

determining, at the server, that the device stack corresponds to the device that is remote to the server and is connected locally to a client that is remote to the server;

facilitating traversing the device stack downwards to identify a device object corresponding to a virtual bus driver at the bottom of the device stack;

attaching a device access restriction object on top of the device stack;

facilitating restriction of access to the one or more device objects from sessions different from a session associated with the device;

receiving, at the device access restriction object, an access request to the device; and determining, at the device access restriction object, whether the access request is allowed access to the device.

11. The non-transitory machine-readable storage medium according to claim 10, wherein the facilitating restriction of access to the one or more device objects comprises:

for each of the one or more device objects in the device stack, determining whether a corresponding symbolic link exists in a global namespace of an object manager namespace (OMN) and moving the symbolic link to a local namespace of the OMN.

12. The non-transitory machine-readable storage medium according to claim 10, wherein the determining whether the access request is allowed access to the device comprises:

determining whether a session from which the access request is received is a predetermined session; and determining that the access request is allowed if the session from which the access request is received is the predetermined session.

13. The non-transitory machine-readable storage medium according to claim 10, wherein the determining whether the access request is allowed access to the device comprises:

determining whether a session from which the access request is received is the same as a session of the client; and determining that the access request is allowed if the session from which the access request is received is the same as the session of the client.

14. The non-transitory machine-readable storage medium according to claim 10, comprising: if the access request is not allowed, generating an error message indicating that the device does not exist.

15. The non-transitory machine-readable storage medium according to claim 10, wherein the one or more operations comprise determining whether the device is configured to be provided with access restriction, wherein the attaching the access restriction object comprises:

attaching the access restriction object on top of the device stack if the device is configured to be provided with access restriction.

16. The non-transitory machine-readable storage medium of claim 10, wherein the one or more operations are performed without hooking to a kernel module.

17. The non-transitory machine-readable storage medium according to claim 10, wherein the device is a USB device.

18. The non-transitory machine-readable storage medium of claim 10, wherein the access request is made by a process of an application, and wherein receiving the access request to the device comprises:
  intercepting the access request to the device made by the process.

19. An apparatus, comprising:
  one or more modules configured to perform one or more operations comprising:
    storing a device stack in a memory of a server, the device stack comprising one or more device objects, each device object associated with a device driver and comprising a software implementation of a device;
    determining, at the server, that the device stack corresponds to the device that is remote to the server and is connected locally to a client that is remote to the server;
    facilitating traversing the device stack downwards to identify a device object corresponding to a virtual bus driver at the bottom of the device stack;
    attaching a device access restriction object on top of the device stack;
    facilitating restriction of access to the one or more device objects from sessions different from a session associated with the device;
    receiving, at the device access restriction object, an access request to the device; and
    determining, at the device access restriction object, whether the access request is allowed access to the device.

20. The apparatus according to claim 19, wherein the facilitating restriction of access to the one or more device objects comprises:
  for each of the one or more device objects in the device stack, determining whether a corresponding symbolic link exists in a global namespace of an object manager namespace (OMN) and moving the symbolic link to a local namespace of the OMN.

21. The apparatus according to claim 19, wherein the determining whether the access request is allowed access to the device comprises:
  determining whether a session from which the access request is received is a predetermined session; and
  determining that the access request is allowed if the session from which the access request is received is the predetermined session.

22. The apparatus according to claim 19, wherein the determining whether the access request is allowed access to the device comprises:
  determining whether a session from which the access request is received is the same as a session of the client; and
  determining that the access request is allowed if the session from which the access request is received is the same as the session of the client.

23. The apparatus according to claim 19, comprising: if the access request is not allowed, generating an error message indicating that the device does not exist.

24. The apparatus according to claim 19, wherein the one or more operations comprise determining whether the device is configured to be provided with access restriction, wherein the attaching the access restriction object comprises:
  attaching the access restriction object on top of the device stack if the device is configured to be provided with access restriction.

25. The apparatus according to claim 19, wherein the one or more operations are performed without hooking to a kernel module.

26. The apparatus according to claim 19, wherein the device is a USB device.

27. The apparatus according to claim 19, wherein the access request is made by a process of an application, and wherein receiving the access request to the device comprises:
  intercepting the access request made by the process to the device.

28. An apparatus comprising:
  means for storing a device stack in a memory of a server, the device stack comprising one or more device objects, each device object associated with a device driver and comprising a software implementation of a device;
  means for determining that the device stack corresponds to the device that is remote to the server and is connected locally to a client that is remote to the server;
  means for facilitating traversing the device stack downwards to identify a device object corresponding to a virtual bus driver at the bottom of the device stack;
  means for attaching a device access restriction object on top of the device stack;
  means for facilitating restriction of access to the one or more device objects from sessions different from a session associated with the device;
  receiving, at the device access restriction object, an access request to the device; and means for determining, at the device access restriction object, whether the access request is allowed access to the device.

* * * * *